(12) United States Patent  (10) Patent No.: US 7,487,637 B2
Buttler  (45) Date of Patent: Feb. 10, 2009

(54) SUBMERGED RUN OF RIVER TURBINE

(75) Inventor: Ernst Buttler, Münster (DE)

(73) Assignee: Stein HT GmbH Spezialtiefbau, Herne (DE)

( * ) Notice: Subject to any disclaimer, the term of this patent is extended or adjusted under 35 U.S.C. 154(b) by 561 days.

(21) Appl. No.: 10/537,730

(22) PCT Filed: Nov. 14, 2003

(86) PCT No.: PCT/EP03/12731

§ 371 (c)(1),
(2), (4) Date: Oct. 17, 2005

(87) PCT Pub. No.: WO2004/051079

PCT Pub. Date: Jun. 17, 2004

(65) Prior Publication Data

US 2006/0127210 A1  Jun. 15, 2006

(30) Foreign Application Priority Data

Dec. 5, 2002  (DE) ................................ 102 56 864

(51) Int. Cl.
*F03C 1/00* (2006.01)
(52) U.S. Cl. .............................. 60/495; 290/42; 290/53
(58) Field of Classification Search .................... 60/495, 60/496; 290/42, 52, 53, 54
See application file for complete search history.

(56) References Cited

U.S. PATENT DOCUMENTS

| 1,570,421 | A | * | 1/1926 | Abraham | 60/503 |
| 2,730,631 | A | * | 1/1956 | Dandini | 290/54 |
| 4,095,918 | A | | 6/1978 | Mouton, Jr. et al. | |
| 4,245,473 | A | * | 1/1981 | Sandoval | 60/496 |
| 4,317,046 | A | * | 2/1982 | Holmberg | 290/1 R |
| 4,462,211 | A | * | 7/1984 | Linderfelt | 60/501 |
| 4,868,408 | A | | 9/1989 | Hesh | |

FOREIGN PATENT DOCUMENTS

| DE | 647 287 C | 7/1937 |
| DE | 41 12 730 C2 | 8/1992 |
| DE | 299 00124 | 5/1999 |
| DE | 200 11 874 U1 | 1/2001 |
| GB | 200 027 A | 7/1923 |
| WO | WO 02/064974 | 8/2002 |
| WO | WO 03/046375 | 6/2003 |

OTHER PUBLICATIONS

International Search Report.

* cited by examiner

*Primary Examiner*—Hoang M Nguyen
(74) *Attorney, Agent, or Firm*—Collard & Roe, P.C.

(57) ABSTRACT

The invention relates to a hydraulic power plant transforming hydraulic energy of a water flow by means of a hydraulic turbine. The inventive hydraulic turbine comprises a rotor, a generator and a float and is anchored in such a way that the rotor thereof is oriented in a direction of flow. In addition, said hydraulic turbine is floating under water surface and the float thereof is impinged upon by a gaseous medium or can be submerged.

20 Claims, 6 Drawing Sheets

SUBMERGED RUN OF RIVER TURBINE

CROSS REFERENCE TO RELATED APPLICATIONS

Applicant claims priority under 35 U.S.C. §119 of German Application No. 102 56 864.2 filed Dec. 5, 2002. Applicant also claims priority under 35 U.S.C. §365 of PCT/EP2003/012731 filed Nov. 14, 2003. The international application under PCT Article 21(2) was not published in English.

The invention relates to a hydraulic power plant for generating electrical energy by transforming hydraulic energy of a water flow by means of a hydraulic turbine comprising at least a rotor,
a generator driven by the rotor and
a float for the hydraulic turbine, wherein the hydraulic turbine is anchored in a fixed position and the rotor is aligned in the direction of flow of the water. Within the scope of the invention, rotor means paddle and vane wheels as well as propellers, multivanes or the like. Ocean currents and rivers are especially available as flowing water.

Unlike wind power plants which convert the kinetic energy of the wind into electrical energy and must accept periods of disuse when there is no wind, hydraulic power plants can generate electrical energy without interruption because flowing water is continuously in motion. Hydraulic power plants of the embodiment described initially are known which have a hydraulic turbine floating on the water surface. On the one hand, this is unsatisfactory from the aesthetic point of view because the natural scenery is disturbed and on the other hand, a reduced energy conversion must be tolerated because in the embodiment as a regular paddle wheel the rotor is only partly immersed and driven in the flowing water (cf. DE 41 12 730 C2). However, hydraulic turbines for use in underwater power plants are also known where impellers are arranged on a framework and said framework is mounted on a foundation at the bottom of the water. In these embodiments sinking the foundations is expensive and satisfactory anchoring of the framework on the foundations is barely ensured so that sufficient alignment of the impellers in the direction of flow is barely ensured (cf. DE 200 11 874 U1). In another underwater hydraulic turbine for generating energy, the running axis of the rotor is rotatably mounted at the lower end with a pin in a bearing. This bearing is located in a multi-part foundation whose individual foundation parts must be floated to the location of usage and must be assembled there at the bottom of the water with the aid of divers (cf. DE 299 00 124 U1).

It is the object of the invention to provide a hydraulic power plant of the embodiment described initially whose hydraulic turbine is not visible during use, which can be installed in a short time and which is also characterised by a simple design from the assembly and maintenance point of view.

This object is solved by the invention for a generic hydraulic power plant by the fact that the hydraulic turbine is held in a floating state underneath the surface of the water and for this purpose the float can be acted upon as desired with a gaseous medium, such as compressed air, for example, and if necessary, flooded with water. These measures of the invention firstly have the consequence that the hydraulic turbine is not visible during use and consequently satisfies all the requirements from the aesthetic point of view since the natural scenery is preserved. In addition, it is ensured that the rotor is continuously located in flowing water over its entire circumference and consequently, optimal conversion of kinetic energy into electrical energy is achieved. Furthermore, a relatively simple design can be achieved from the constructional point of view, ensuring short-term use and simple assembly. Maintenance and repair work can easily be carried out because the hydraulic turbine can be raised to the surface of the water by acting thereupon with a gaseous medium such as, for example, acting upon the float with compressed air. In fact, the lifting and sinking process of the hydraulic turbine can be controlled by supplying air via a compressed air line and, if appropriate also by way of flooding. It is also possible to lower the hydraulic turbine to the bottom of the water.

Further features important to the invention are described in the following. Thus, the invention teaches that the rotor is mounted on a rotor axle aligned in the direction of flow of the water and its rotor blades can be adjusted by means of an adjusting mechanism in or opposite to the direction of flow in order to prevent a reduction in power, for example when the flow pressure exceeds a predetermined amount. This is achieved by feathering the pitch of the rotor blades as it were and consequently reducing the leading surfaces. The invention further provides that the rotor axle is constructed as a hollow axle and forms the float. Such a hollow axle is distinguished by high bending resistance and supports the alignment of the rotor in the direction of flow of the flowing water. According to the invention, the rotor blades of the rotor mounted rotationally fixedly on the rotor axles can be swivelled in the direction of flow and are held against the flow pressure by means of spring loading and when the flow pressure exceeds a predetermined amount, they are successively swivelled in the direction of flow whilst reducing the leading surface. In this respect a relatively simple and appropriate adjusting mechanism is achieved for the rotor blades. This especially applies when the rotor blades are supported on their side facing away from the flow by means of supporting lugs against sprayed-out leaf springs which are distributed over the circumference of the rotor axle and are affixed to the rotor axle. The spring force of these leaf springs defines the flow pressure at which the rotor blades are held. Only when the flow pressure exceeds the spring force of the leaf springs, are the rotor blades swivelled into a feathered pitch as it were.

According to another embodiment of the invention, a thrust bearing is arranged on the rotor axle wherein steering levers are pivoted on the rotor blades and the steering levers are pivoted on a bearing ring displaceable on the rotor axle in the longitudinal direction of the axle, and wherein a compression spring surrounding the rotor axle is further arranged between the thrust bearing and the bearing ring in the embodiment of a helical spring, which acts on the rotor blades via the steering levers and against the direction of flow of the water. In this case, the rotor blades are swivelled when the effective flow pressure exceeds the spring force of the compression spring. At least at the front and rear axial ends, the rotor axle can be constructed as spindle axles where the thrust bearing and/or the bearing for the rotor blades are constructed as spindle nuts which can be adjusted and stopped on the spindle axle so that the compression springs can be pre-stressed by a predetermined amount or the spring pressure can be varied. According to a modified embodiment of the invention, a helical compression spring or tension spring surrounding the spindle axle is arranged between the bearing ring and the bearing for the rotor blades, where the bearing ring as well as the bearing for the rotor blades are constructed as spindle nuts. In this case, it depends on the direction of flow and consequently on the impacting of the rotor blades from one direction or the other as to whether the spring arranged between the bearing ring and the bearing for the rotor blades operates as a compression spring or tension spring.

The invention further teaches that a plurality of rotors each having an adjusting mechanism are arranged on the rotor axles at predetermined distances. In this embodiment the flow pressure from the flowing water is distributed over a plurality of rotor blades so that even very low flow velocities make it possible to achieve sufficient energy conversion. At the same time, a reduction of the flow pressure is achieved as a result of its distribution over the individual rotor blades. This applies especially when the outside diameters of the rotors or their rotor blades increase by a pre-determined gradation in the direction of flow of the water and exceed the previously arranged rotors.

The rotor axle is preferably constructed as a conically expanding hollow axle in the direction of flow of the water and is thereby distinguished not only by a design favourable for the flow but at the same time, the stresses and especially bending forces acting on the flange-mounted generator are also reduced. The hollow axle is more suitably built up of axial sections forming hollow chambers, each having a rotor and being extendable, wherein the axial sections can be connected to one another by means of gas- or air-tight and water-tight flange connections. The rotor axle can thereby be lengthened with sufficient stability and floatability as desired. In this connection, it is also possible for the rotor axle to be supported at predetermined distances by means of guide bearings. Furthermore, the rear end of the rotor axle in the direction of flow can have a tail unit so that perfect alignment of the rotor axle and the rotors located thereon is ensured.

The generator can be arranged in a housing, e.g., a housing formed of half-shells such as tube halves with external cooling ribs which preferably run in the longitudinal direction of the housing and consequently in the direction of flow. It is further possible that a plurality of generators are arranged one after the other in a row and are connected one to the other and to the rotor axle to achieve optimal conversion of energy into electrical current. For reasons of flow technology, a hollow flow cone can be flange-mounted to the housing on the leading edge which also provides for buoyancy in the generator area. This is because the float is preferably formed by the hollow axle and, if appropriate the housing and the flow cone. According to another embodiment of the invention, the float is formed by a framework with hollow supports and/or boxes for one or a plurality of hydraulic turbines. In addition, one or a plurality of gas or compressed air lines can be connected to the floodable float. Finally, the invention provides that a plurality of hydraulic turbines are arranged next to one another in a row and/or in an offset arrangement one after the other and if appropriate are connected to one another by means of flexible or elastic connecting means in order to realise a power plant as it were. The hydraulic turbine or hydraulic turbines are anchored by means of chains, ropes or the like on the bank or the bottom of the water so that in the latter case, the anchoring remains out of sight.

The invention is explained in detail subsequently with reference to drawings showing only one exemplary embodiment. In the figures.

Figures 1, 2:
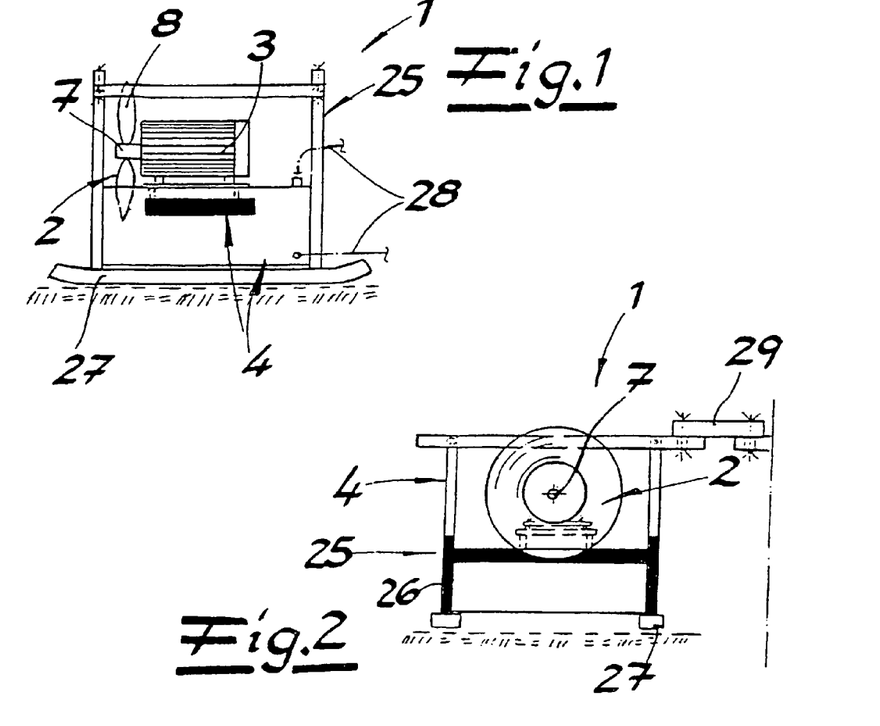
FIG. 1 is a schematic side view of a hydraulic turbine according to the invention.
FIG. 2 is a front view of the subject matter from FIG. 1.
Figure 3:
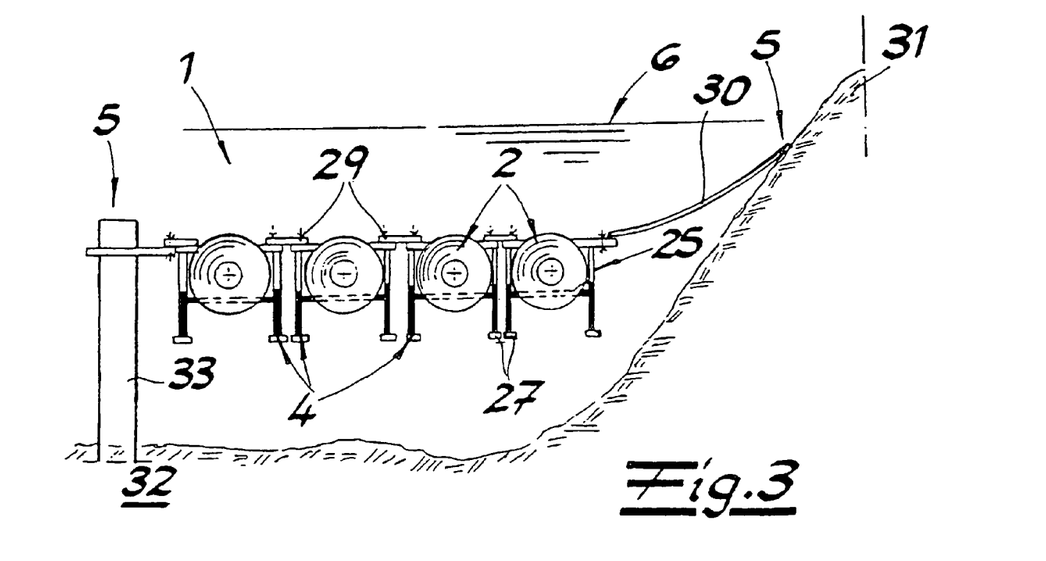
FIG. 3 is a front view of a hydraulic power plant according to the invention with a plurality of hydraulic turbines arranged next to one another in a row.
Figure 4:
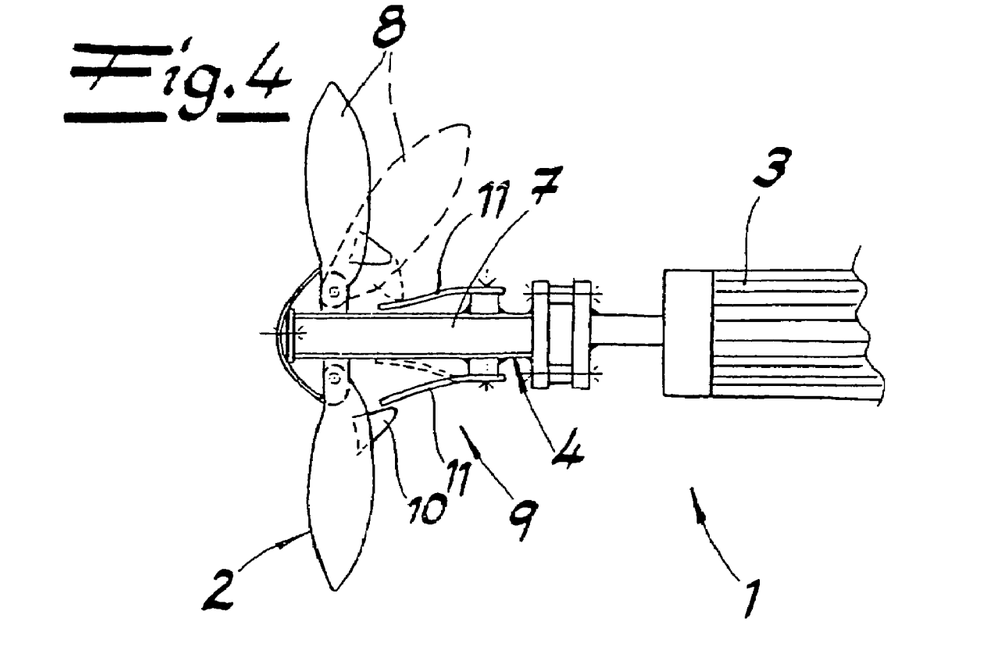
FIG. 4 is a section from the subject matter from FIG. 1 with rotor blades swivellable in the direction of the generator.
Figure 5:
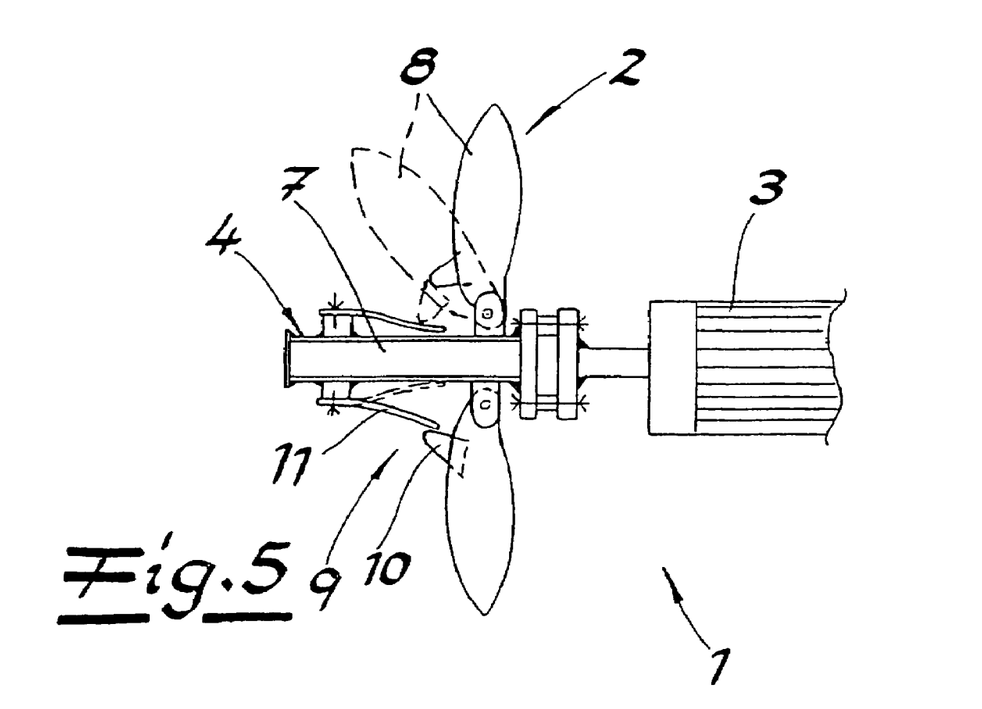
FIG. 5 shows the subject matter from FIG. 4 with rotor blades swivellable in the opposite direction.
Figure 6:
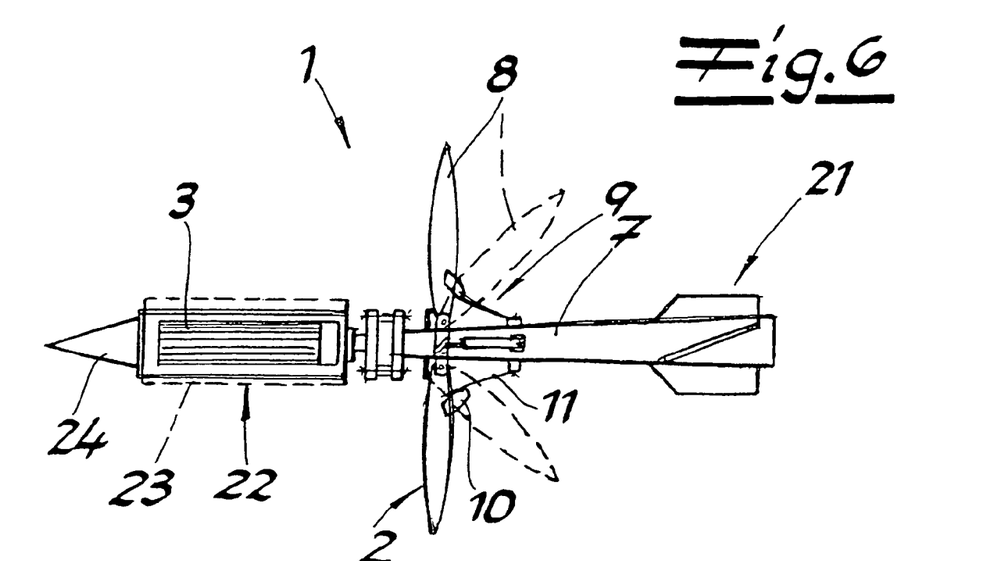
FIG. 6 shows a modified embodiment of the subject matter from FIG. 1 with a generator accommodated in a housing.
Figure 7:
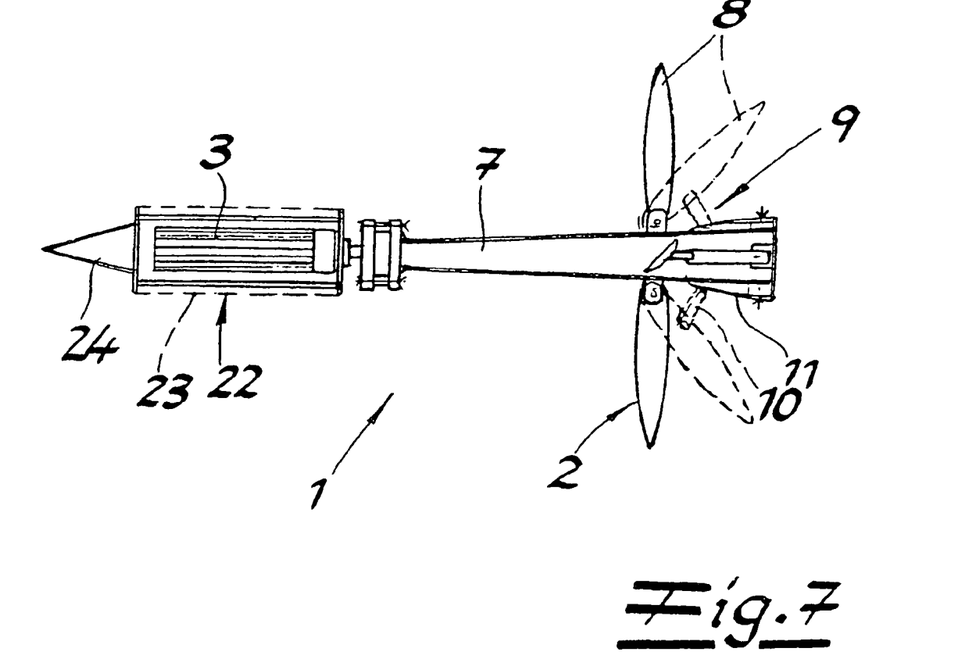
FIG. 7 shows a modified embodiment of the subject matter from FIG. 6.
Figure 8:
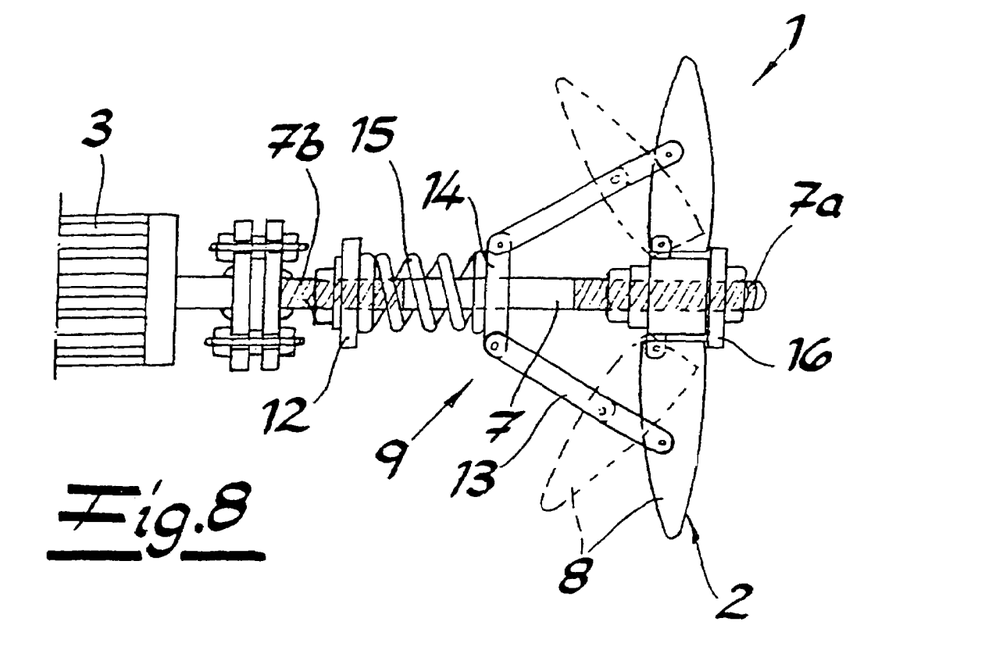
FIG. 8 is a further modified embodiment of the subject matter from FIG. 1.
Figure 9:
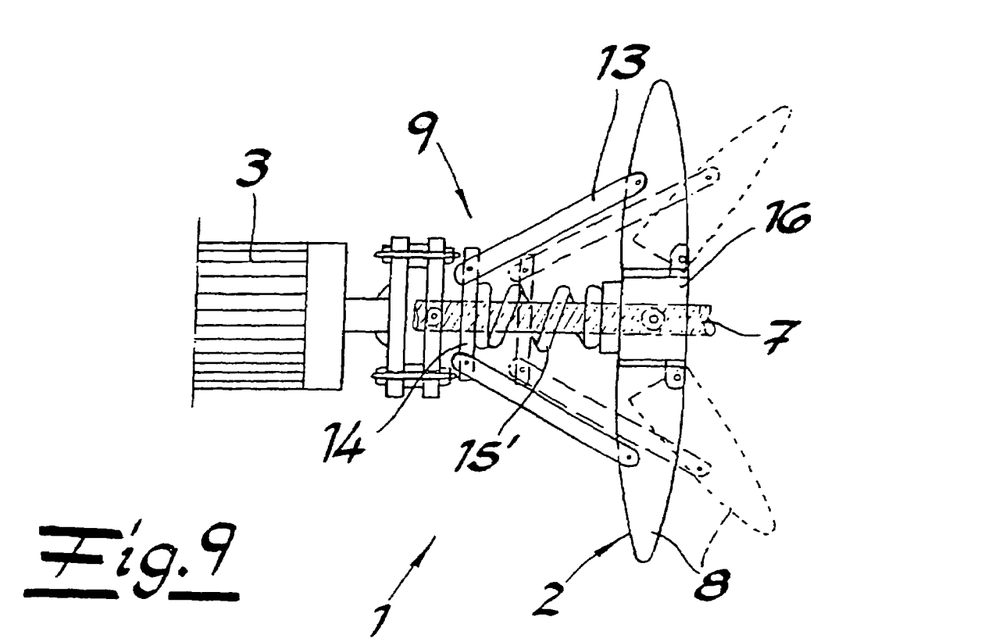
FIG. 9 is a modified embodiment of the subject matter from FIG. 8.
Figure 10:
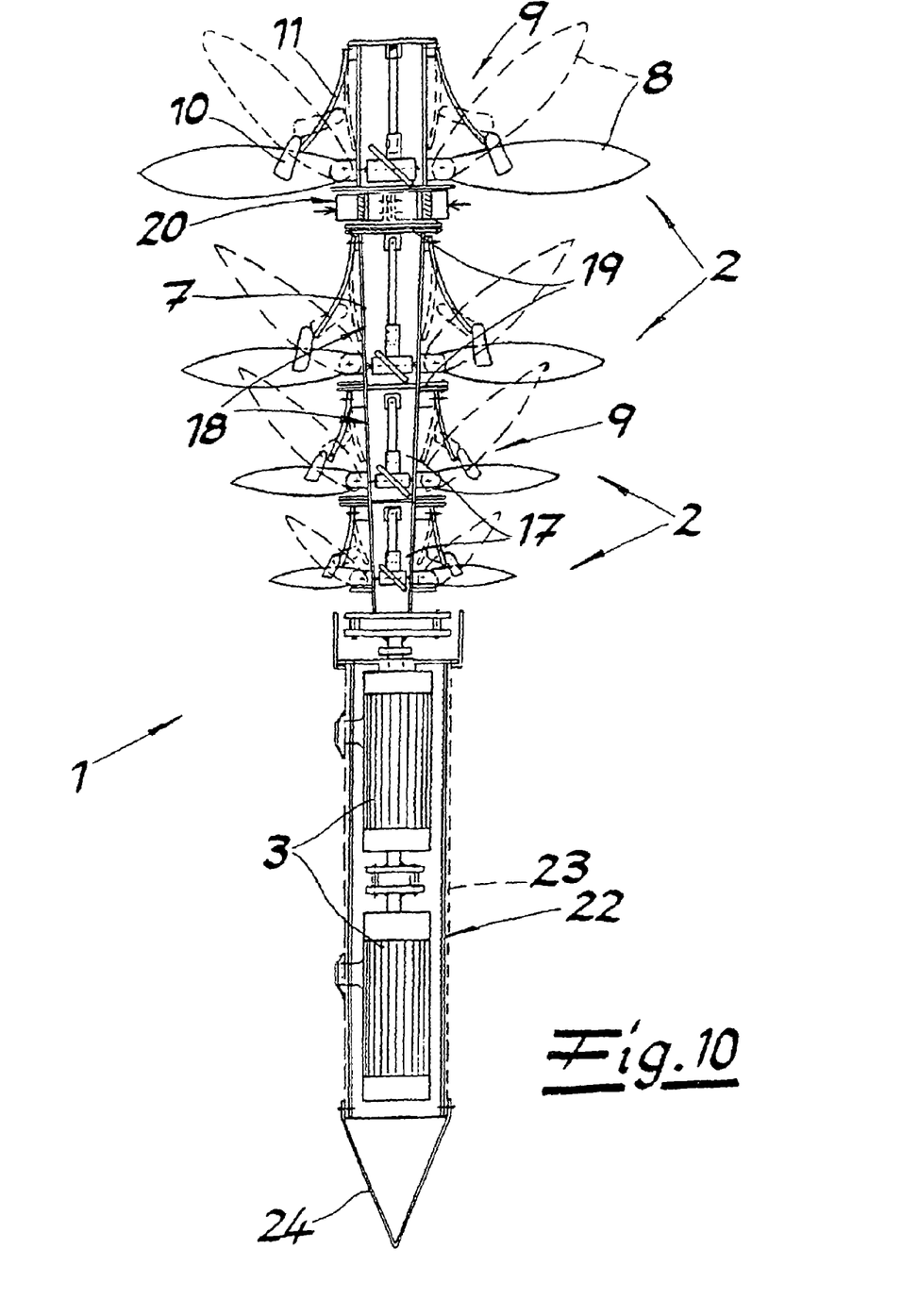
FIG. 10 is a further modified embodiment of the subject matter from FIG. 7.
Figure 11:
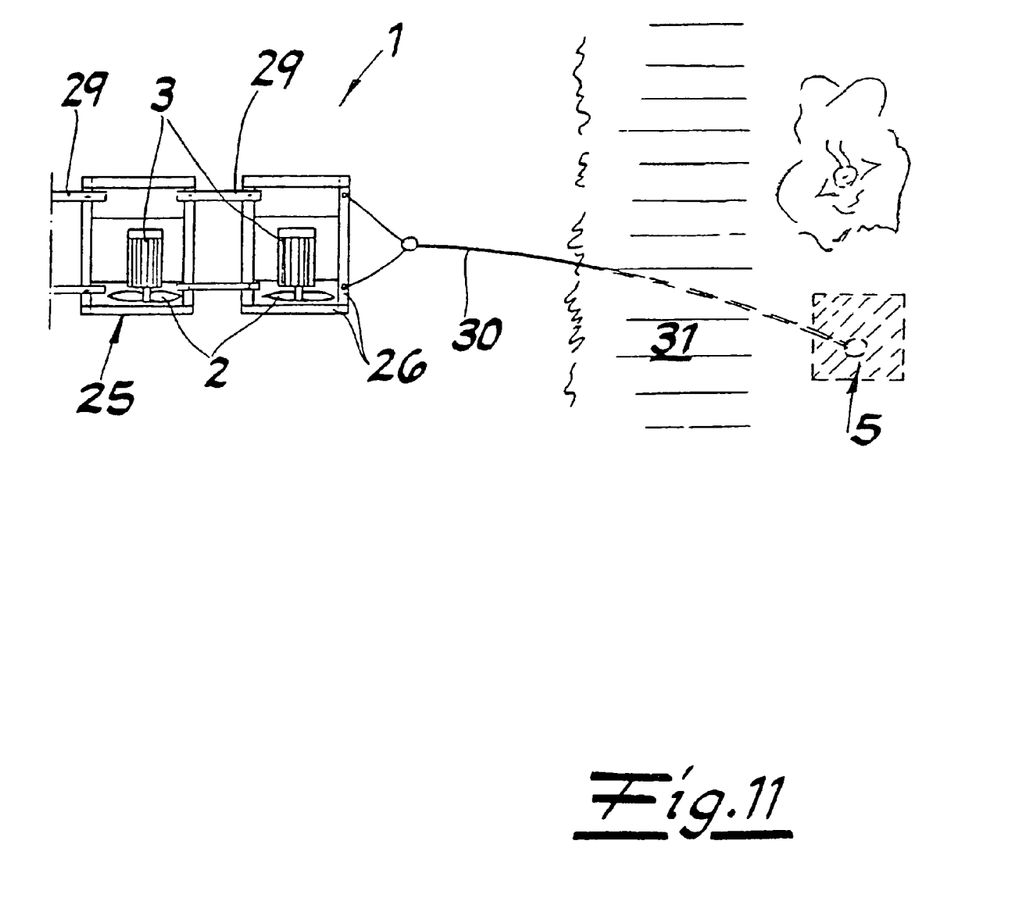
FIG. 11 is sectional plan view of the subject matter from FIG. 3.

The figures show a hydraulic power plant for generating electrical energy or electric current by converting hydraulic energy of flowing water. This hydraulic power plant has at least one hydraulic turbine 1 comprising at least one rotor 2, a generator 3 driven by the rotor 2 and a float 4 for the hydraulic turbine 1, wherein the hydraulic turbine 1 is anchored in a fixed position, e.g. at fixed points 5 on the bank and/or at the bottom of the water, such that the rotor 2 is aligned in the direction of flow of the water. The hydraulic turbine 1 is held in a floating state underneath the surface 6 of the water. For this purpose the float 4 can be acted upon as desired with compressed air or another gaseous medium and if necessary, flooded with water. The valve and control devices required for this are not shown.

The rotor 2 is mounted on a rotor axle 7 aligned in the direction of flow of the water. Its rotor blades 8 can be adjusted by means of an adjusting mechanism 9 in or opposite to the direction of flow. In addition, the rotor blades 8 are adjustable about their longitudinal axis to vary their angle of attack. In some embodiments the rotor axle 7 is constructed as a hollow axle which at the same time forms the float 4. The rotor blades 8 of the rotor 2 mounted rotationally fixedly on the rotor axle 7 can be swivelled in the direction of flow and are held against the flow pressure by means of spring loading. When the flow pressure exceeds a predetermined amount, the rotor blades 8 are successively swivelled in the direction of flow whilst reducing the leading surface in a feathered pitch as it were. This is indicated by the dashed lines. In detail, the rotor blades 8 are supported on their side facing away from the flow by means of supporting lugs 10 against splayed-out leaf springs 11 which are distributed over the circumference of the rotor axle 7 and are affixed to the rotor axle 7.

In another embodiment a thrust bearing 12 is arranged on the rotor axle 7. Moreover, pivoted on the rotor blades 8 are steering levers 13 which are likewise pivoted on a bearing ring 14 displaceable on the rotor axle 7 in the longitudinal direction of the axis. Between the thrust bearing 12 and the bearing ring 14 is a compression spring 15 surrounding the rotor axle 7, which acts on the rotor blades 8 via the steering levers 13 and against the direction of flow of the water. The rotor axle 7 can at least be constructed as a spindle axle 7a, 7b at the front and rear axial ends, the thrust bearing 12 and/or the bearing 16 for the rotor blades 8 being constructed as spindle nuts which can be adjusted and stopped on the spindle axle 7a, 7b. In one modified embodiment a helical compression spring 15' surrounding the spindle axle 7 is arranged between the bearing ring 14 and the bearing 16 for the rotor blades 8, which can also operate as a tension spring depending on the direction of flow. The bearing ring 14 as well as the bearing 16 for the rotor blades 8 are constructed as spindle nuts.

A plurality of rotors 2 each having an adjusting mechanism 9 can be arranged on the rotor axle 7 at predetermined distances. In this case, the outside diameters of the rotors 2 or their rotor blades 8 increase by a pre-determined gradation in the direction of flow of the water and exceed the previously arranged rotors 2, thus forming a flow cone which is indicated. In this embodiment it is recommended to construct the rotor axle 7 as a hollow axle which expands conically in the direction of flow of the water with its tapered end adjacent to a generator 3. The hollow axle 7 can be built up of axial sections 18 forming hollow chambers 17, each having a rotor 2 and an adjusting mechanism 9 and can thus be lengthened by a plurality of axial sections 18. For this purpose the axial sections 18 can be connected to one another by means of gas- or air-tight and water-tight flange connections 19. Furthermore, it is also possible for the rotor axle 7 to be supported at predetermined distances by means of guide bearings 20. In one embodiment, the rear end of the rotor axle 7 in the direction of flow has a tail unit 21, whereby the alignment of the hydraulic turbine 1 in the direction of flow is stabilised.

The generator 3 can be arranged in a housing 22, e.g., a housing formed of half-shells with external cooling ribs 23. It is also possible for a plurality of generators 3 to be arranged one after the other in a row and connected one to the other and to the rotor axle 7. In this case, the generators 3 can also be encased in a housing. A hollow flow cone 24 is preferably flange-mounted to the housing 22 on the leading edge.

In one embodiment, the float 4 is formed by the hollow axle 7, if appropriate the housing 22 and the flow cone 24. In another embodiment, the float 4 is formed by a framework 25 with hollow supports 26 and/or boxes for one or a plurality of hydraulic turbines 1. This framework 25 can be equipped with skids 27 for mounting.

One or a plurality of compressed air lines 28 are connected to the floodable float 4. In order to achieve a hydraulic power plant, a plurality of hydraulic turbines 1 can be arranged next to one another in a row and/or in an offset arrangement and/or one above the other and if appropriate connected to one another by means of flexible or elastic connecting means 29. The hydraulic turbine or turbines 1 are anchored by means of chains, ropes 30 or the like on the bank 31 and/or the bottom 32 of the water at fixed points 5. A driven or bored pile 33 can be inserted for anchoring at the bottom 32 of the water, without using any expensive foundations.

The invention claimed is:

1. A hydraulic power plant for generating electrical energy by transforming hydraulic energy of a water flow by means of a hydraulic turbine (1) comprising at least
   a rotor (2),
   a generator (3) driven by the rotor (2) and
   a float (4) for the hydraulic turbine (1), wherein
   a) the hydraulic turbine (1) is anchored in a fixed position and the rotor (2) is aligned in the direction of flow of the water,
   b) the hydraulic turbine (1) is held in a floating state underneath the surface of the water,
   c) for this purpose the float (4) can be acted upon with a gaseous medium, including compressed air and if necessary, flooded with water,
   d. the rotor (2) is mounted on a rotor axle (7) aligned in the direction of flow of the water,
   e) the rotor blades (8) of the rotor (2) can be adjusted by means of an adjusting mechanism (9) in or opposite to the direction of flow and
   f) the rotor axle (7) is constructed as a hollow axle and forms the float (4).

2. The hydraulic power plant according to claim 1, wherein the rotor blades (8) of the rotor (2) mounted rotationally fixedly on the rotor axles (7) can be swivelled in the direction of flow and are held against the flow pressure by means of spring loading and when the flow pressure exceeds a predetermined amount, they are successively swivelled in the direction of flow whilst reducing the leading surface.

3. The hydraulic power plant according to claim 1, wherein the rotor blades (8) are supported on their side facing away from the flow by means of supporting lugs (10) against splayedout leaf springs (11) which are distributed over the circumference of the rotor axles (7) and are affixed to the rotor axle (7).

4. The hydraulic power plant according to claim 1, wherein a thrust bearing (12) is arranged on the rotor axle (7), that steering levers (13) are pivoted on the rotor blades (8), the steering levers (13) are pivoted on a bearing ring (14) displaceable on the rotor axle (7) in the longitudinal direction of the axis, and that a compression spring (15) surrounding the rotor axle (7) is arranged between the thrust bearing (12) and the bearing ring (14), which compression spring acts on the rotor blades (8) via the steering levers (13) and against the direction of flow of the water.

5. The hydraulic power plant according to claim 1, wherein at least at the front and rear axial ends the rotor axle (7) is constructed as a spindle axle (7a, 7b) and that the thrust bearing (12) and/or the bearing (16) for the rotor blades (8) are constructed as spindle nuts which can be adjusted and stopped on the spindle axle (7a, 7b).

6. The hydraulic power plant according to claim 1, wherein a compression spring (15') or tension spring surrounding the spindle axle (7) is arranged between the bearing ring (14) and the bearing (16) for the rotor blades (8), and the bearing ring (14) as well as the bearing (16) for the rotor blades (8) are constructed as spindle nuts.

7. The hydraulic power plant according to claim 1, wherein a plurality of rotors (2) each having an adjusting mechanism (9) is arranged on the rotor axles (7) at predetermined distances.

8. The hydraulic power plant according to claim 7, wherein the outside diameters of the rotors (2) or their rotor blades (8) increase by a pre-determined gradation in the direction of flow of the water and exceed the previously arranged rotors (2) in each case.

9. The hydraulic power plant according to claim 1, wherein the rotor axle (7) is constructed as a conically expanding hollow axle in the direction of flow of the water.

10. The hydraulic power plant according to claim 1, wherein the hollow axle (7) is built up of axial sections (18) forming hollow chambers (17), each having a rotor (2) and an adjusting mechanism (9) and can be extended by further axial sections (18), wherein the axial sections (18) can be connected to one another by means of gas- or air-tight and water-tight flange connections (19).

11. The hydraulic power plant according to claim 1, wherein the rotor axle (7) is supported at predetermined distances by means of guide bearings (20).

12. The hydraulic power plant according to claim 1, wherein the rear end of the rotor axle (7) in the direction of flow has a tail unit (21)

13. The hydraulic power plant according to claim 1, wherein the generator (3) is arranged in a housing (22), including a housing formed of half-shells with external cooling ribs (23).

14. The hydraulic power plant according to claim 1, wherein a plurality of generators (3) are arranged and coupled one after the other in a row and are connected to the rotor axle (7).

15. The hydraulic power plant according to claim 1, wherein a hollow flow cone (24) is flange-mounted to the housing (22) on the leading edge.

16. The hydraulic power plant according to claim 1, wherein the float (4) is formed by the hollow axle (7), if appropriate the housing (22) and the flow cone (24).

17. The hydraulic power plant according to claim 1, wherein the float (4) is formed by a framework (25) with hollow supports (26) and/or boxes and if appropriate, skids (27) for one or a plurality of hydraulic turbines (1).

18. The hydraulic power plant according to claim 1, wherein one or a plurality of gas or compressed air lines (28) are connected to the floodable float (4).

19. The hydraulic power plant according to claim 1, wherein a plurality of hydraulic turbines (1) are arranged nest to one another in a row and/or in an offset arrangement one after the other and/or one above the other and if appropriate are connected to one another by means of flexible or elastic connecting means (29).

20. The hydraulic power plant according to claim 1, wherein the hydraulic turbine(s) (1) are anchored by means of chains, ropes (30) or the like on the bank (31) and/or the bottom (32) of the water at fixed points (5).

* * * * *